United States Patent [19]

Marsi et al.

[11] Patent Number: 4,586,719
[45] Date of Patent: May 6, 1986

[54] MECHANICAL SEAL

[75] Inventors: Joseph A. Marsi, Rancho Palos Verdes; Winfred J. Wiese, Whittier; Lawrence I. Takumi, Carson; Clark S. Boster, Whittier; Gordhan K. Vaghasia, Cerritos; Jerel E. Ellison, Downey; Alan B. Coleman, South Pasadena, all of Calif.

[73] Assignee: Borg-Warner Corporation, Chicago, Ill.

[21] Appl. No.: 646,887

[22] Filed: Sep. 4, 1984

Related U.S. Application Data

[63] Continuation-in-part of Ser. No. 496,322, May 19, 1983.

[51] Int. Cl.$^4$ .............................................. F16J 15/34
[52] U.S. Cl. ...................................... 277/41; 277/81 R
[58] Field of Search ..................... 277/81 R, 87, 30, 41

[56] References Cited

U.S. PATENT DOCUMENTS

| | | | |
|---|---|---|---|
| 2,444,713 | 7/1948 | Solari | 286/11 |
| 2,498,739 | 2/1950 | Magnesen | 286/11 |
| 2,559,964 | 7/1951 | Jensen | 286/11 |
| 2,653,837 | 9/1953 | Voytech | 286/11.14 |
| 4,094,513 | 6/1978 | Kime et al. | 277/41 |
| 4,202,553 | 5/1980 | Kropp | 277/41 |
| 4,272,084 | 6/1981 | Martinson | 277/30 |

Primary Examiner—Robert I. Smith
Attorney, Agent, or Firm—John W. Harbst

[57] ABSTRACT

A single or multiple stage mechanical seal assembly in which one seal ring is resiliently coupled to a rotatable shaft and the other seal ring is resiliently urged toward the first seal ring by axially-arranged identical springs received in spring pockets in a spring retainer, some pockets opening at one radial surface of the retainer and others opening at the other radial surface of the retainer. The outer surfaces of the seal rings are protected against deflection by being encircled by cylindrical members and one seal ring is resiliently coupled to its encircling cylindrical member. A balance sleeve means partly supports the axially movable seal ring and is capable of angular adjustment to compensate for shaft misalignment.

16 Claims, 6 Drawing Figures

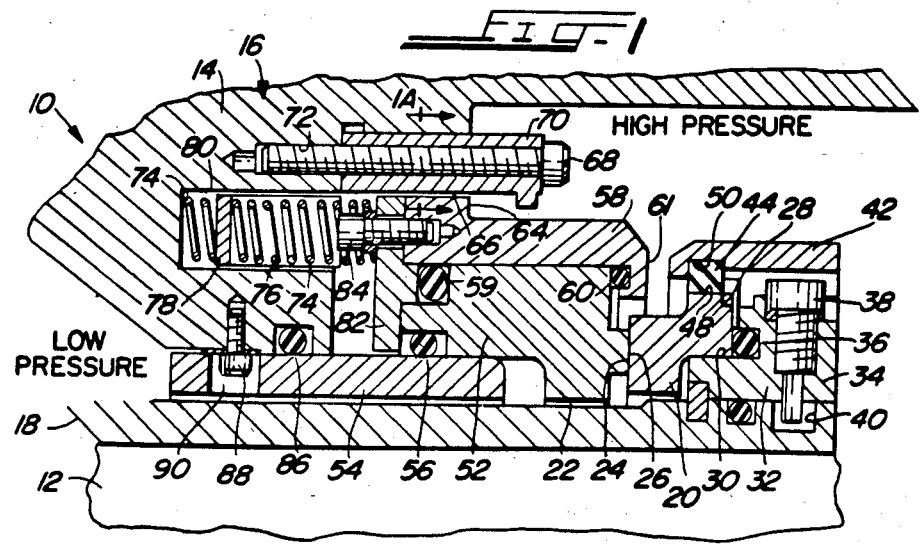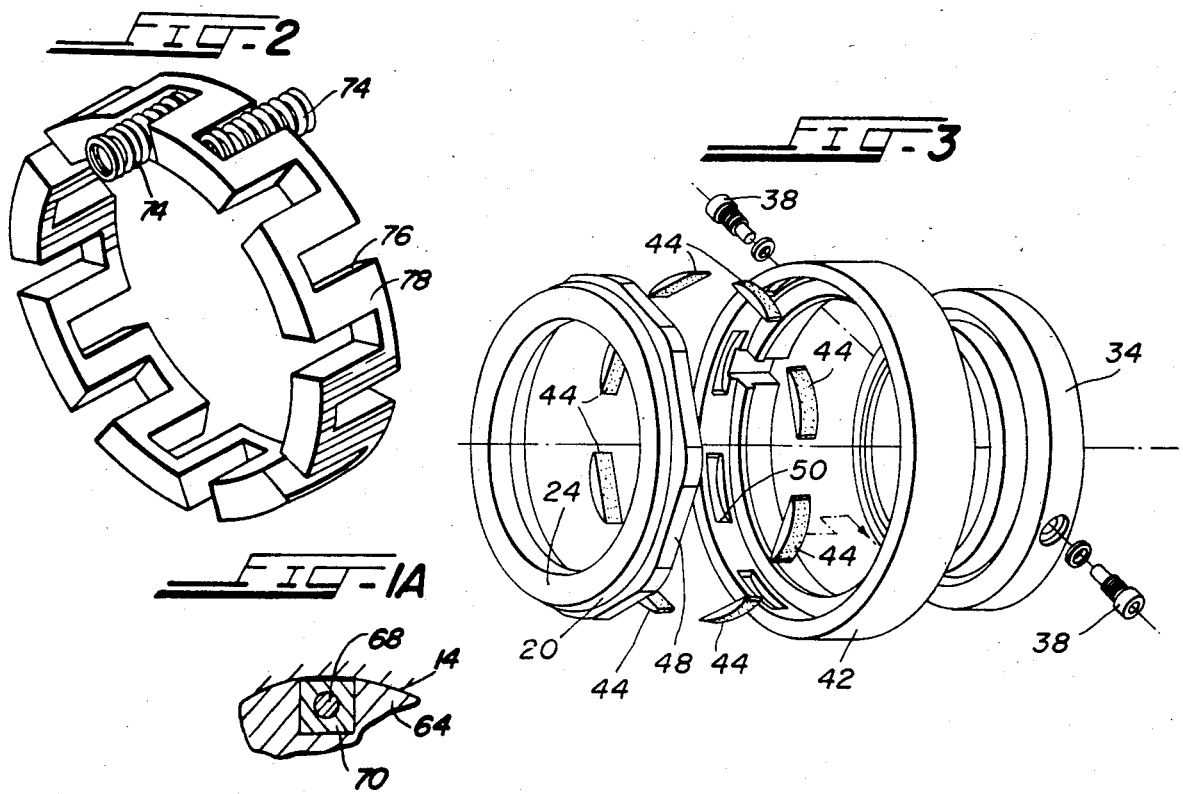

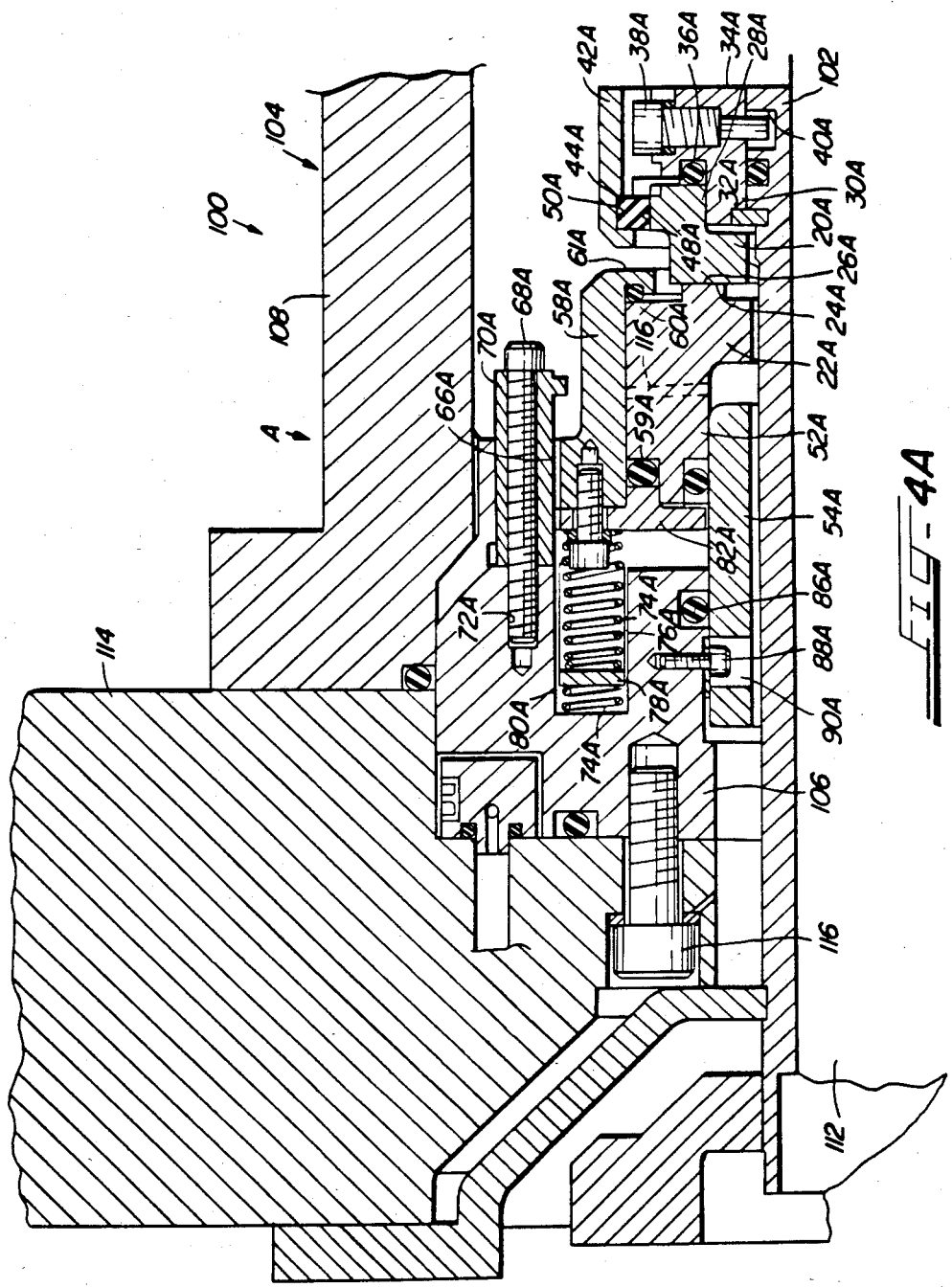

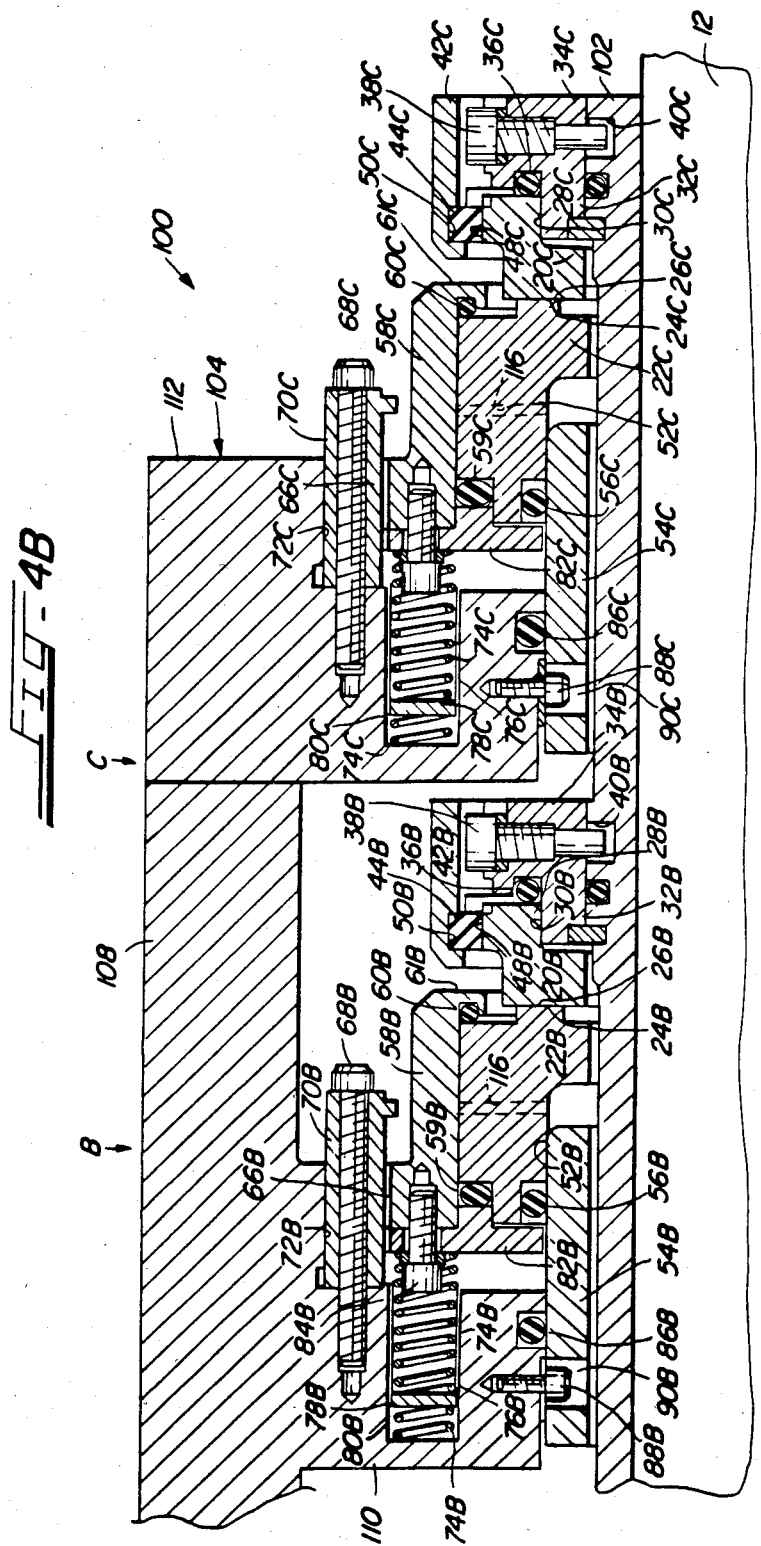

MECHANICAL SEAL

REFERENCE TO RELATED APPLICATIONS

This application is a continuation-in-part of copending application, Ser. No. 496,322, filed May 19, 1983.

BACKGROUND OF THE INVENTION

This invention relates to improvements in high pressure mechanical seal assemblies constructed and used to prevent the uncontrolled leakage of a liquid along a rotating shaft, as for example, leakage along the shaft of a rotary liquid pump.

The present invention was developed especially for use with nuclear reactor coolant pumps, boiler recirculating pumps, boiler feed pumps and pipeline pumps, and will meet the requirements for extreme and widely changing conditions of pressures and temperatures encountered in these uses, it being understood that the present invention can also be used in less demanding installations. As an example of the widely changing pressures and temperature, the normal operating pressure in a pressurized water reactor is about 2200 psig, and during start-up, the pressure can be as low as 20 to 30 psig. In such reactor, the water in a coolant loop can reach a temperature of about 600° F., while the water entering the seal area may be as low as about 80° F. In these pumps, the pump shaft may move axially and may also wobble or deflect radially. An additional rigorous operating condition for the seals in such application is the combination of high pressure and high surface speeds which result from large diameter parts. It is thus necessary to construct a mechanical seal assembly capable of performing under these operational conditions.

Mechanical seal assemblies usually comprise the combination of a rotatable seal ring connected to a rotatable shaft for rotation therewith and a non-rotatable or stationary seal ring connected to the flange of a housing. Each seal ring has a radial seal face and the seal faces oppose one another. Whether or not the seal faces engage one another is debatable because there is usually a film of fluid therebetween providing lubrication for the rotation of one of the faces. In many seal assemblies, one or more coil springs urge one of the rings toward the other, so that in reality, one or both of the seal rings are capable of limited axial movement, even though they are commonly referred to as "rotatable" or "stationary". Multiple stage seal assemblies comprising a plurality of seal assemblies are known in the art.

DESCRIPTION OF THE PRIOR ART

In Martinson U.S. Pat. No. 4,272,084, a multiple stage mechanical seal assembly is described. The rotatable seal ring of each stage is connected by axial pins to a flange on a sleeve which, in turn, is connected to the rotatable shaft. Each stage has its own sleeve. The stationary seal ring of each stage is sealed to a carrier which is connected to a housing by an encircling elastomeric O-ring confined by a retainer ring and snap rings. A plurality of coil springs urge the stationary ring toward the rotatable ring in each stage. Each spring is received in a spring pocket, a part of which is in the carrier and a part of which is in the housing. No spring retainers are used.

U.S. Pat. Nos. 2,444,713, Solari, 2,498,739, Magnesen, 2,559,964, Jensen, 2,653,837 and Voytech, teach, in mechanical seal assemblies, the use of resilient rings to connect one of the seal rings to either a shaft or a housing.

Kime et al, U.S. Pat. No. 4,094,513, and Kropp, U.S. Pat. No. 4,202,553, both teach multiple stage mechanical seal assemblies including a fixed and stationary, cylindrical member surrounding a shaft with spring pockets therein, some pockets facing one way and some pockets facing the opposite way. Each spring facing in the same direction urges one seal ring of a stage toward the other ring of the same stage.

SUMMARY OF THE INVENTION

The mechanical seal assembly of this invention is capable of performing its intended function under the widely adverse operating condition, and can be used singly or in multiple stages. The seal assembly is especially adapted for use in horizontal or vertical pumps, of the type previously described.

The seal assembly of this invention comprises a stationary seal ring and a rotatable seal ring having opposed faces, one ring is urged toward the other ring. The stationary seal ring is usually made of carbon and the rotatable seal ring is made of a harder material, such as titanium carbide, aluminum oxide and the like. The complete seal assembly is mounted on a shaft sleeve, so that it can be pre-assembled and then axially positioned on the shaft at the proper operating location.

The stationary carbon seal ring is sealed, by spaced O-rings, to an encircling metal retainer. Also at least a portion of a face of the ring is covered by a radially inwardly directed flange on the retainer. Because the inside diameter of the stationary field ring is exposed to the lower pressure fluid and the retainer is exposed to the higher pressure fluid, the retainer substantially eliminates severe radial deflections of the carbon seal ring which could be caused by extreme pressure differentials on the inside and outside of the ring. The stationary seal ring is supported on a "balance" sleeve means surrounding and spaced from the shaft sleeve. The balance sleeve permits some angular movement or wobbling of the shaft so as to eliminate adverse effects of shaft misalignment which frequently occurs in pumps of the type described.

The rotating seal ring of the assembly is resiliently connected to the rotating shaft (or sleeve, as the case may be) by transversely positioned elastomeric keys which fit into pockets formed by transverse external flats formed on the seal ring and transverse grooves cut into the inside of a cylindrical lock ring. The grooves are in an axially extending portion of the lock ring which surrounds the rotating seal ring. The formation of the flats on the rotating seal ring avoids notching, and thus weakening, the seal ring to receive the usual drive pins. The lock ring prevents the rotating seal ring from flying apart in case of its failure.

The elastomeric keys provide a self-compensating feature to the seal assembly. The keys exert radially inwardly directed forces on the seal ring and when subjected to torque, the forces increase, causing the seal ring and its seal face to distort in a wavy pattern. This permits fluid flow across the seal faces and reduces the frictional forces therebetween. As torque increases, the radial forces increase and the seal face deflection increases which further reduces the frictional force between the faces.

A novel spring holder is used to position a plurality of springs to resiliently urge the stationary seal ring toward the rotatable seal ring. The spring holder is positioned in an annular cavity in the pump housing, and specifically in that part of the housing known as a seal flange. The spring holder is a ring having a radial front surface and a radial back surface with axially arranged pockets, for each receiving a coil spring. Some spring pockets open to the front surface and some spring pockets open to the rear surface. Generally the front and rear pockets are offset and evenly spaced from one another. Usually there are equal numbers of front and rear pockets. This series arrangement of springs provides a substantially uniform spring load in the stationary seal ring and permits twice the axial movement of the pump shaft as would be permitted by the susual spring arrangement wherein the springs act in one direction without affecting the function of the seal assembly. The arrangement of springs according to this invention results in a relatively short (in axial length) and compact seal assembly.

BRIEF DESCRIPTION OF THE DRAWINGS

FIG. 1 is a partial cross-sectional view through a single stage mechanical seal assembly constructed according to this invention;

FIG. 1A is a partial cross-sectional view taken on line 1A of FIG. 1;

FIG. 2 is a perspective illustration of a spring retainer for use in a seal assembly constructed according to this invention and showing the spring pockets with springs in some pockets;

FIG. 3 is an exploded view of the rotating seal ring, the lock ring and the resilient connection therebetween; and FIGS. 4A and 4B when laid end-to-end show a partial cross-sectional view through a multiple-stage mechanical seal assembly constructed according to this invention.

DETAILED DESCRIPTION OF THE PREFERRED EMBODIMENT

FIG. 1 illustrates a single stage mechanical seal assembly 10 for use with a rotatable shaft 12 and a seal flange 14 of a housing 16, the assembly 10 comprising shaft sleeve 18, rotatable seal ring 20, and stationary seal ring 22, one of which is resiliently urged toward the other. Seal rings 20, 22 have relatively rotating, opposed, and lapped faces 24, 26 across which the flow of high pressure fluid in housing 16 to lower pressure zone (at the left of FIG. 1) is substantially prevented.

Ring 20 is provided with annular flange 28, the inner defining surface 30 of which is received on flange 32 of adaptor 34. The rear of flange 28 is axially supported by O-ring 36 encircling adapter flange 32, to avoid undesirable effects of different radial deflections of ring 20 and flange 32 from operating conditions due to the difference in materials from which they are made. Cap screws 38 are threadably received in adaptor 34 and their ends are received in notches 40 in shaft sleeve 18, thus forming a driving connection between shaft sleeve 18 and adaptor 34.

Lock ring 42 encircles adaptor 34 and also flange 28, and is connected thereto (see FIG. 3 also) by elastomeric keys 44 received in transverse pockets 46 defined by flats 48 on seal ring flange 28 and grooves 50 in lock ring 42. Keys 44 provide a resilient driving connection between lock ring 42, flange 34, sleeve 18, and seal ring 20 and cushion the drive therebetween. The resilient connection also axially locates seal ring 20 and lock ring 42 during their assembly. Cap screws 38 are enclosed by ring 42. Ring 42, by enshrouding seal ring 20, prevents it from flying apart in case of its failure.

The elastomeric keys 44 exert radially inwardly directed forces on the flats 48 of the seal ring 20. When the keys 44 are subjected to torque forces, as when the frictional forces between the seal faces 24 and 26 increase, the keys exert increased forces on the ring 20 and cause the face 24 to distort and deflect in a wavy pattern, permitting increased fluid flow across the faces 24, 26 with a reduction of the friction therebetween. As torque increases, deflection of the seal faces 24 increases, so that the seal is self-compensating.

Seal ring 22 has a rearwardly extending reduced inner diameter flange 52 partially encircling balance sleeve means 54. Seal ring 22 is centered on sleeve means 54 by O-ring 56 positioned between ring 22 and sleeve 54. O-ring 56 permits limited axial movement of ring 22 relative to sleeve 54. This arrangement also avoids undesirable effects of different radial deflections of ring 22 and sleeve 54 from operating conditions due to differences in their materials of construction. The outer circumference of seal ring 22 is encircled and sealed to retainer 58 by O-rings 59 and 60. Retainer 58 also has radially inwardly directed flange 61 extending over a portion of the front of seal ring 22. Retainer 58 substantially eliminates severe radial deflections of seal ring 22 which could be caused by extreme pressure differentials in the inside and outside of ring 22. The rear of retainer 58 has a radially outwardly extending flange 64 with notches or slots 66 therethrough. Cap screws 68 with surrounding keys 70 are slidably received in notches 66, the cap screws being also received in threaded openings 72 in seal flange 14, thus connecting seal ring 22 to flange 14 and preventing rotation of seal ring 22 relative to flange 14. Keys 70 are flanged at their outer ends to limit axial movement of seal ring 22 and retainer 58 during their assembly with seal flange 14.

Retainer 58, and thus seal ring 22, are resiliently urged toward the right, as in FIG. 1 by a plurality of usually identical coil springs 74, each received in a pocket 76 in spring retainer 78 (see also FIG. 2). Spring retainer 78 is positioned in annular cavity 80 in flange 14 and has a radial front surface and a radial back surface. Some pockets 76 open to the front surface while the others open to the rear surface. These springs 74 which extend froward to the front surface of retainer 78 define a first spring set. These springs 74 which extend rearward to the rear surface of retainer 78 define a secong spring set. By such construction, the ends of those springs defining the first spring set engage surfaces which are axially spaced from the surfaces engaged by the ends of those springs defining the second spring set. The total spring force from the first and second set of springs 74 is applied to annular flange member 82 connected to retainer 58 by cap screws 84. This arrangement of springs 74 provides a substantially uniform spring load on the ring 22 under all operating conditions and permits twice the axial movement of the pump shaft compared to a more conventional spring arrangement wherein the springs are all facing in one direction. An O-ring 86 is positioned between balance sleeve means 54 and flange 14. Cap screw 88 threadably received in flange 14 and in enlarged slot 90 in sleeve 54 axially and radially positions sleeve 54 with respect to flange 14. O-ring 86 provides a hydraulic seal between sleeve means 54 and flange 14. Because sleeve means 54 is spaced from sleeve 18 and thus also from shaft 12, shaft wobble or misalignment will not affect the alignments of stationary seal ring 22 and its associated parts.

Seal ring 20 is preferably made of carbon and seal ring 22 is preferably made of a harder material, such as titanium carbide, silicon carbide, and the like. The remainder of the assembly, except for the elastomeric O-rings and keys 44, is generally made of suitable metal, depending upon the environment in which the assembly is to be used.

FIGS. 4A and 4B when laid end-to-end illustrate a multiple stage mechanical seal assembly identified as 100, each stage comprising individual seal assemblies A, B and C. Each stage is essentially identical in construction. Differences, if any, are generally in the housing parts with which the stages are associated. Sleeve 102 is continuous and extends the length of the assembly 100. Housing 104, of multiple parts, comprises plug 106, generally cylindrical part 108 with a generally centrally located flange 110, and separate end flange 112. Flange 114 is connected to plug 106 by cap screws 116 and the function of the plug 106 is essentially the same as previously described seal flange 14. Flanges 110 and 112 also function the same as seal flange 14.

The remainder of the parts are the same in each stage as in the FIG. 1 assembly except that each stationary seal ring is provided with a radial passage 116, so as to permit any seepage of fluid into a zone between seal rings 22A, 22B, and 22C and their retainers 58A, 58B and 58C to flow to the low pressure side of the seal. This prevents any pressure build-up between seal ring 22A, 22B and 22C and retainers 58A, 58B and 58C. which could damage ring 22. Generally a passage such as 116 is not necessary in a single stage seals but may be used therein if desirable. The parts in FIGS. 4A and 4B are identified using a suffix A, B or C depending upon the stage in which they are a part and reference is made to the description of the various parts. Suffice to say the the essential features of the single stage seal assembly are incorporated in each stage of the multiple stage seal assembly.

While the invention has been discussed with reference to a particular structure, it is to be understood that the claims are intended to also cover reasonable equivalents of the disclosed structure.

We claim:

1. A mechanical seal assembly for separating a high pressure fluid and a lower pressure fluid, and associated with a rotatable shaft and a stationary housing, said assembly comprising:
   a rotatable seal ring connected to said shaft;
   a non-rotatable seal ring connected to said housing for limited axial movement;
   a plurality of coil springs;
   a ring-like spring holder having front and rear surfaces;
   a plurality of spring pockets in said holder, some of which open to said front surface and some of which open to said rear surface; and
   means in said housing supporting said spring holder relative to said non-rotatable seal ring so that said springs resiliently urge said non-rotatable seal ring axially toward said rotatable seal ring.

2. A mechanical seal assembly as recited in claim 1, further comprising means defining an annular cavity in said housing for receiving said spring retainer and said springs in said sping pockets.

3. A mechanical seal assembly as recited in claim 1, further comprising resilient means connecting said rotatable ring to said shaft.

4. A mechanical seal assembly as recited in claim 3, wherein said resilient means comprises elastomeric keys.

5. A mechanical seal assembly as recited in claim 4, further comprising a cylindrical ring encircling said rotatable seal ring, said cylindrical ring and said rotatable seal ring each being formed to define a plurality of transverse slots for receiving said elastomeric keys.

6. A mechanical seal assembly as recited in claim 5, further comprising a generally cylindrical protective retainer surrounding and sealed to said non-rotatable seal ring.

7. A mechanical seal assembly as recited in claim 6, further comprising an annular member abutting said protective retainer and said non-rotatable seal ring, said annular member being so constructed and arranged to transmit spring force to said non-rotatable seal ring.

8. A mechanical seal assemlby as recited in claim 7, further comprising a shaft sleeve interposed between said seal rings and said shaft for locating said seal assembly on said shaft.

9. A mechanical seal assembly as recited in claim 8, further comprising at least another seal assembly of the same construction in combination therewith.

10. A multiple stage mechanical seal assembly, each stage of which is as recited in claim 8.

11. A multiple stage mechanical seal assembly as recited in claim 10, further comprising radial passage means in said non-rotatable seal ring to permit the flow of fluid from between said non-rotatable seal ring and said retainer, and thus prevent fluid pressure build-up therebetween.

12. A mechanical seal assembly for use with a pump shaft subject to axial and radial deflections and for substantially preventing the flow of fluid along at least a portion of said shaft, said assembly comprising the combination of a pair of relatively rotatable seal rings, each having a seal face which oppose one another, a series of circularly arranged springs defining first and second spring sets which combine to resiliently urge one seal ring axially toward the other to maintain their seal faces in a closely opposing relationship, the springs defining the first spring set being mounted such that their ends engage surfaces which are axially spaced from those surfaces engaged by the ends of the springs defining the second spring set, a sleeve means surrounding and spaced from said shaft supporting said one seal ring, and resilient sealing means interposed between said one seal ring and said sleeve means permitting limited axial movement of said one seal ring relative to said sleeve means.

13. A mechanical seal assembly as recited in claim 12, further comprising a shaft sleeve for locating said seal assembly on said shaft, said shaft sleeve being interposed between said shaft and said sleeve means.

14. A mechanical seal assembly as recited in claim 12, wherein said sleeve means is spaced from said shaft sleeve permitting radial deflection of said shaft sleeve and said shaft without affecting the radial location of said one seal ring.

15. A multiple stage mechanical seal assembly, each stage of which is as recited in claim 14.

16. A self-compensating mechanical seal assembly for separating a high pressure fluid and a lower pressure fluid, and associated with a rotatable shaft and a stationary housing, said assembly comprising:
- a rotatable seal ring connected to said shaft;
- a non-rotatable seal ring connected to said housing for limited axial movement;
- a seal face on each seal ring with one opposing the other;
- means urging the non-rotatable seal ring toward the rotatable seal ring;
- elastomeric means connecting said rotatable seal ring to said shaft comprising circumferentially spaced keys which exert radially directed forces on said rotatable seal ring which forces increase as torque on said ring increases, said forces deflecting the seal face of said rotatable seal ring permitting increased flow of fluid thereacross as the forces increase.

* * * * *